US008286236B2

(12) United States Patent
Jung et al.

(10) Patent No.: US 8,286,236 B2
(45) Date of Patent: *Oct. 9, 2012

(54) MANUFACTURING CONTROL SYSTEM

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA
(US); Clarence T. Tegreene, Bellevue,
WA (US); Lowell L. Wood, Jr.,
Bellevue, WA (US)

(73) Assignee: The Invention Science Fund I, LLC,
Bellevue, WA (US)

( * ) Notice: Subject to any disclaimer, the term of this
patent is extended or adjusted under 35
U.S.C. 154(b) by 1079 days.

This patent is subject to a terminal disclaimer.

(21) Appl. No.: 12/012,504

(22) Filed: Jan. 31, 2008

(65) Prior Publication Data

US 2009/0165126 A1 Jun. 25, 2009

Related U.S. Application Data

(63) Continuation-in-part of application No. 12/005,162,
filed on Dec. 21, 2007.

(51) Int. Cl.
*G06F 7/04* (2006.01)
*G06F 12/14* (2006.01)
*G06F 19/00* (2006.01)
*H04L 29/06* (2006.01)
*H04L 9/32* (2006.01)

(52) U.S. Cl. ............ 726/21; 726/30; 713/165; 713/168;
713/189; 700/98; 700/103; 700/116; 700/117;
700/145; 700/159

(58) Field of Classification Search .................... 726/21,
726/30; 713/165, 168, 189; 700/98, 103,
700/116, 117, 145, 159
See application file for complete search history.

(56) References Cited

U.S. PATENT DOCUMENTS

| 5,204,055 | A | 4/1993 | Sachs et al. |
| 5,762,125 | A | 6/1998 | Mastrorio |
| 5,892,900 | A | 4/1999 | Ginter et al. |
| 6,207,876 | B1 | 3/2001 | Kellems et al. |
| 6,438,457 | B1 | 8/2002 | Yokoo et al. |
| 6,458,595 | B1 | 10/2002 | Selinfreund |
| 6,499,026 | B1 | 12/2002 | Rivette et al. |
| 6,539,283 | B2 | 3/2003 | Takagi |
| 6,560,511 | B1 | 5/2003 | Yokoo et al. |
| 6,584,376 | B1 | 6/2003 | Van Kommer |
| 6,637,013 | B1 * | 10/2003 | Li .................. 716/112 |

(Continued)

OTHER PUBLICATIONS

Dey, Anind K.; Abowd, Gregory D.; Salber, Daniel; "A Conceptual Framework and a Toolkit for Supporting the Rapid Prototyping of Context-Aware Applications"; Human-Computer Interaction; bearing a date of 2001; pp. 97-166 (print-out pp. 1-67); vol. 16; No. 2, 3 & 4.

(Continued)

*Primary Examiner* — Aravind Moorthy

(57) ABSTRACT

Methods and systems for a manufacturing control system include but are not limited to identifying at least one object data file configured to produce an object by a manufacturing machine; confirming that an authorization code is associated with the object data file, the authorization code configured to be received by the manufacturing machine, the manufacturing machine adapted to receive the authorization code; and enabling the manufacturing machine to interface with the object data file only if the authorization code meets one or more predetermined conditions.

57 Claims, 10 Drawing Sheets

U.S. PATENT DOCUMENTS

| | | |
|---|---|---|
| 6,801,822 B1 | 10/2004 | Fujiwara et al. |
| 6,859,782 B2 | 2/2005 | Harshaw |
| 6,973,576 B2 | 12/2005 | Giobbi |
| 7,013,190 B2 | 3/2006 | Fujieda |
| 7,017,043 B1 | 3/2006 | Potkonjak |
| 7,082,399 B2 | 7/2006 | Utsumi |
| 7,099,742 B2 | 8/2006 | Tajima et al. |
| 7,111,258 B2 | 9/2006 | Kato et al. |
| 7,111,321 B1 | 9/2006 | Watts, Jr. et al. |
| 7,120,932 B2 | 10/2006 | Lockhart et al. |
| 7,203,966 B2 | 4/2007 | Abburi et al. |
| 7,209,900 B2 | 4/2007 | Hunter et al. |
| 7,212,574 B2 | 5/2007 | Abrams, Jr. et al. |
| 7,213,157 B2 | 5/2007 | Dariel |
| 7,296,015 B2 | 11/2007 | Poltorak |
| 7,337,218 B2 | 2/2008 | Arnold |
| 7,341,410 B2 | 3/2008 | Hill et al. |
| 7,349,758 B2 | 3/2008 | Miro et al. |
| 7,430,762 B2 | 9/2008 | Klinefelter et al. |
| 7,474,932 B2 | 1/2009 | Geng |
| 7,493,596 B2 | 2/2009 | Atkin et al. |
| 7,793,353 B2 | 9/2010 | Klinefelter et al. |
| 7,904,187 B2 | 3/2011 | Hoffberg et al. |
| 7,941,845 B2 | 5/2011 | Brunet et al. |
| 7,957,824 B2 | 6/2011 | Boronvinskih et al. |
| 8,065,741 B1 | 11/2011 | Coblentz et al. |
| 2002/0035450 A1 | 3/2002 | Thackston |
| 2002/0064759 A1 | 5/2002 | Durbin et al. |
| 2002/0072821 A1 | 6/2002 | Baker |
| 2002/0076682 A1 | 6/2002 | Herman et al. |
| 2002/0099473 A1 | 7/2002 | Amadeo et al. |
| 2002/0199123 A1 | 12/2002 | McIntyre et al. |
| 2003/0023337 A1 | 1/2003 | Godfrey et al. |
| 2003/0036945 A1 | 2/2003 | Del Vecchio et al. |
| 2003/0069658 A1 | 4/2003 | Yamazaki |
| 2003/0095665 A1 | 5/2003 | Wheeler et al. |
| 2003/0176939 A1 | 9/2003 | Yoshida et al. |
| 2003/0217275 A1 | 11/2003 | Bentley et al. |
| 2003/0224823 A1 | 12/2003 | Hurst et al. |
| 2003/0226030 A1 | 12/2003 | Hurst et al. |
| 2004/0030901 A1 | 2/2004 | Wheeler et al. |
| 2004/0044901 A1 | 3/2004 | Serkowski et al. |
| 2004/0054907 A1 | 3/2004 | Chateau et al. |
| 2004/0084520 A1 | 5/2004 | Muehl et al. |
| 2004/0093516 A1 | 5/2004 | Hornbeek et al. |
| 2005/0080799 A1 | 4/2005 | Harnden et al. |
| 2005/0097332 A1 | 5/2005 | Imai |
| 2006/0026672 A1 | 2/2006 | Braun |
| 2006/0036570 A1 | 2/2006 | Schaefer et al. |
| 2006/0053478 A1 | 3/2006 | Horman et al. |
| 2006/0174346 A1 | 8/2006 | Carroll et al. |
| 2006/0259177 A1 | 11/2006 | Toyoshima et al. |
| 2007/0006324 A1* | 1/2007 | Osada et al. ............ 726/27 |
| 2007/0073433 A1 | 3/2007 | Froeschner et al. |
| 2007/0143601 A1 | 6/2007 | Arroyo et al. |
| 2007/0165508 A1 | 7/2007 | Kobayashi et al. |
| 2007/0171801 A1 | 7/2007 | Kobayashi et al. |
| 2007/0185815 A1 | 8/2007 | Boccon-Gibod et al. |
| 2007/0191982 A1* | 8/2007 | Sullivan ............ 700/182 |
| 2007/0211597 A1 | 9/2007 | Kobayashi et al. |
| 2007/0218426 A1 | 9/2007 | Quadling et al. |
| 2007/0282480 A1* | 12/2007 | Pannese et al. ............ 700/213 |
| 2008/0008348 A1 | 1/2008 | Metois et al. |
| 2008/0091300 A1 | 4/2008 | Fletcher et al. |
| 2008/0111816 A1* | 5/2008 | Abraham et al. ............ 345/420 |
| 2008/0165372 A1* | 7/2008 | Yamada et al. ............ 358/1.4 |
| 2008/0168527 A1 | 7/2008 | Koved et al. |
| 2008/0210747 A1 | 9/2008 | Takashima |
| 2008/0215176 A1* | 9/2008 | Borovinskih et al. ............ 700/117 |
| 2008/0276791 A1 | 11/2008 | Lemons |
| 2008/0306874 A1 | 12/2008 | White |
| 2009/0137408 A1 | 5/2009 | Jacobson |
| 2009/0157452 A1 | 6/2009 | Arora et al. |
| 2009/0164379 A1 | 6/2009 | Jung et al. |
| 2009/0165126 A1 | 6/2009 | Jung et al. |
| 2009/0222914 A1* | 9/2009 | Ozawa ............ 726/21 |
| 2009/0238362 A1 | 9/2009 | Kitani et al. |

OTHER PUBLICATIONS

Garfinkel, Tal; Pfaff, Ben; Chow, Jim; Rosenblum, Mendel; Boneh, Dan; "Terra: A Virtual Machine-Based Platform for Trusted Computing"; 19th Symposium on Operating System Principles (SOSP 2003); bearing a date of Oct. 19-22, 2003; pp. 1-14; Bolton Landing; New York; USA.

Garfinkel, Tal; Rosenblum, Mendel; Boneh, Dan; "Flexible OS Support and Applications for Trusted Computing"; Proceedings of HotOS IX: The 9th Workshop on Hot Topics in Operating Systems; bearing a date of May 18-21, 2003; total pp. 7; The USENIX Association.

Kraljic, Ivan C.; Quenot, Georges M.; Zavidovique, Bertrand; "A Methodology for Rapid Prototyping of Real-Time Image Processing VLSI Systems"; pp. 1-7; located at http://clips.imag.fr/mrim/georges.quenot/articles/rsp95.pdf.

U.S. Appl. No. 12/079,921, Jung et al.
U.S. Appl. No. 12/287,704, Jung et al.
U.S. Appl. No. 12/287,719, Jung et al.
U.S. Appl. No. 12/288,336, Jung et al.
U.S. Appl. No. 12/290,001, Jung et al.
U.S. Appl. No. 12/321,365, Jung et al.
U.S. Appl. No. 12/321,385, Jung et al.

* cited by examiner

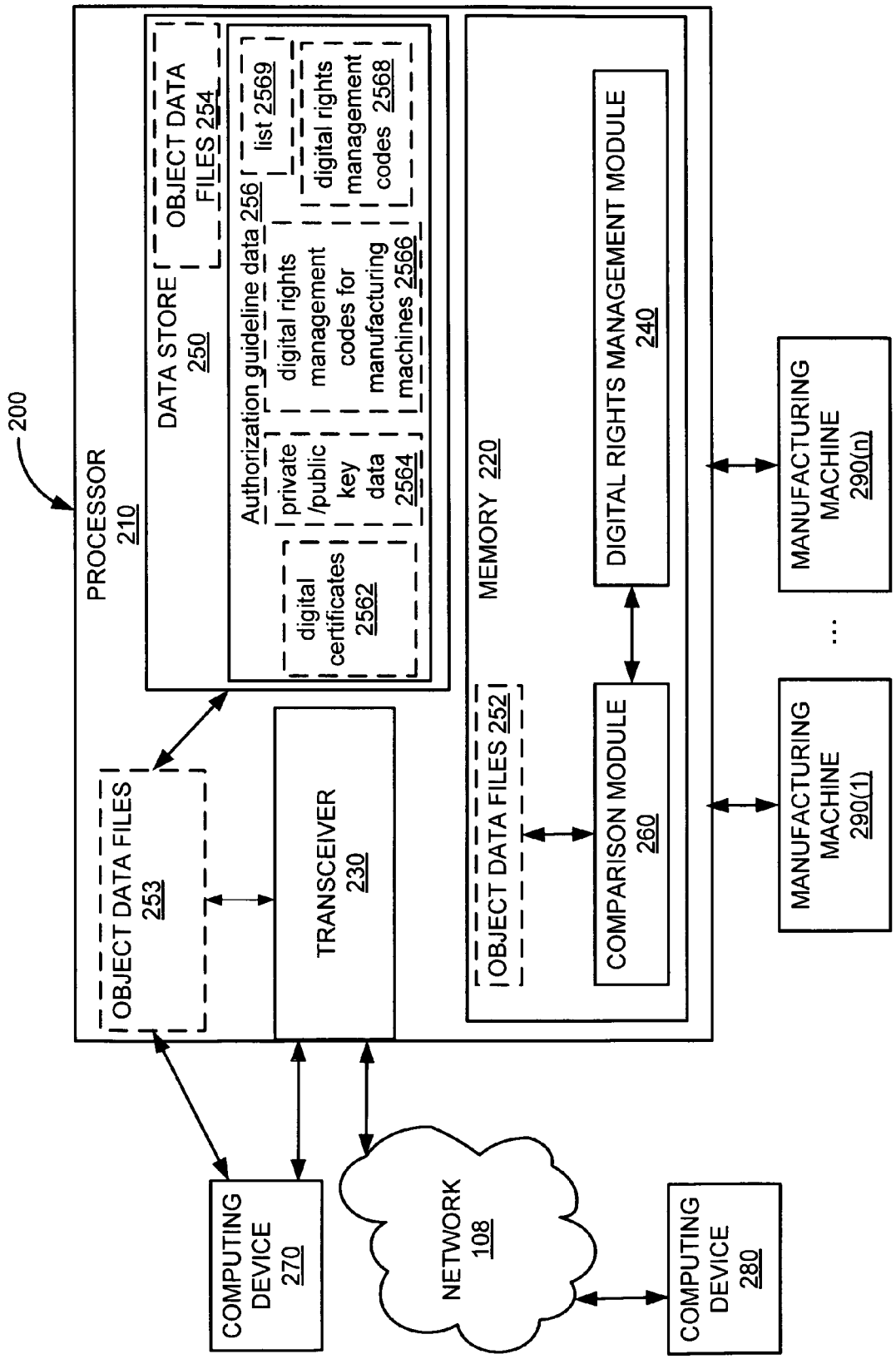

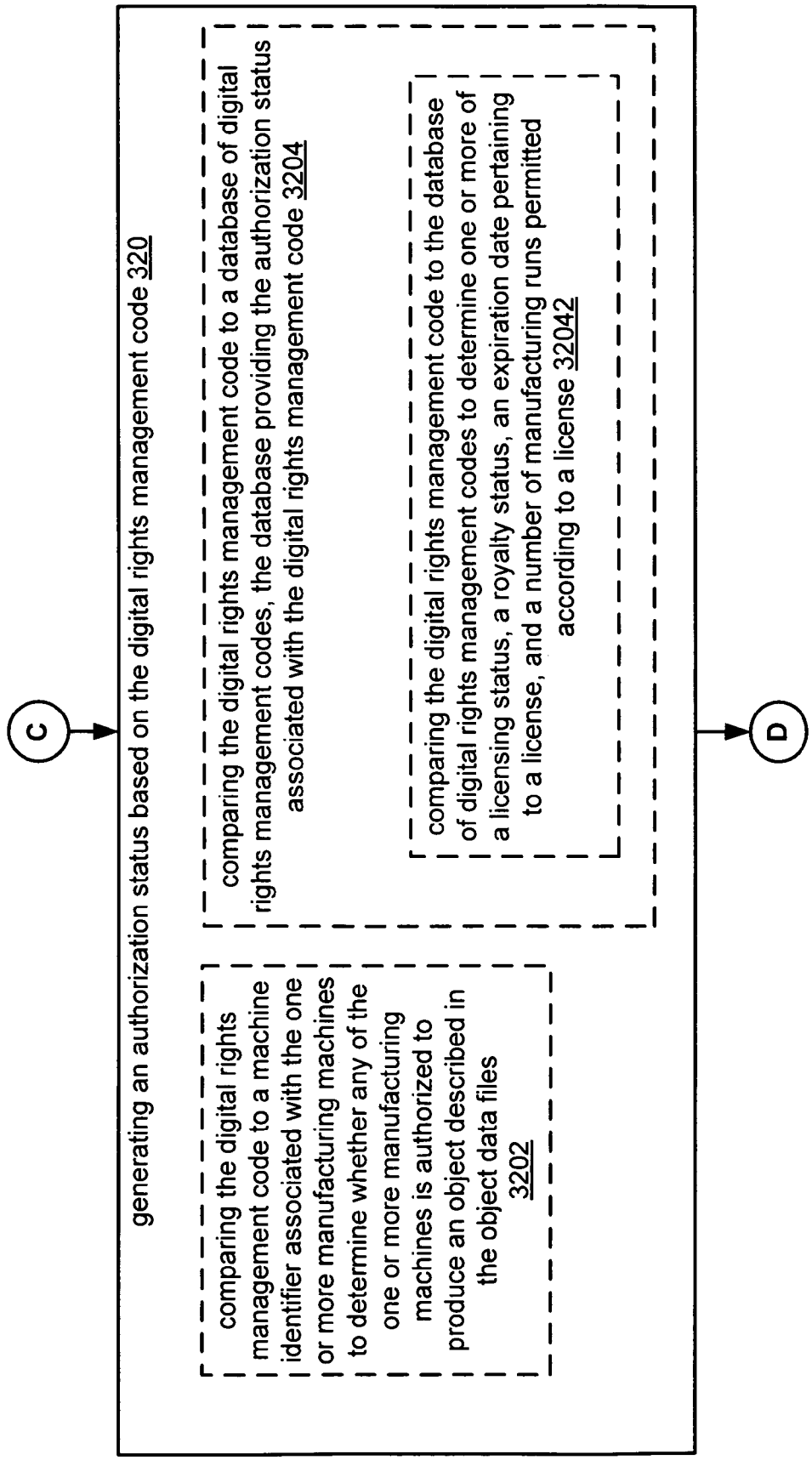

FIG. 3D

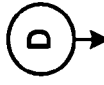

configuring one or more manufacturing machines to operate as a function of the authorization status 330 enabling the one or more manufacturing machines to operate if the authorization status provides permission for operation wherein the one or more manufacturing machines perform one or more of rapid prototyping, three-dimensional printing, two-dimensional printing, freeform fabrication, solid freeform fabrication, and seriolithography 3302 enabling the one or more manufacturing machines to operate if the authorization status provides permission for operation wherein the one or more manufacturing machines include a subtractive manufacturing machine, including machines adapted for drilling, milling, turning, laser cutting, waterjet cutting, plasma cutting, wire electrical discharge cutting, cold, warm and hot forging metal fabrication, computer numerical controlled fabrication machine, and/or an additive manufacturing machine, and/or an injection molding machine 3304 enabling the one or more manufacturing machines to operate if the authorization status provides permission for operation wherein the one or more manufacturing machines include one or more of an extrusion manufacturing machine, a melting manufacturing machine, a solidification manufacturing machine, an ejection manufacturing machine, a die casting manufacturing machine, a stamping process machine 3306

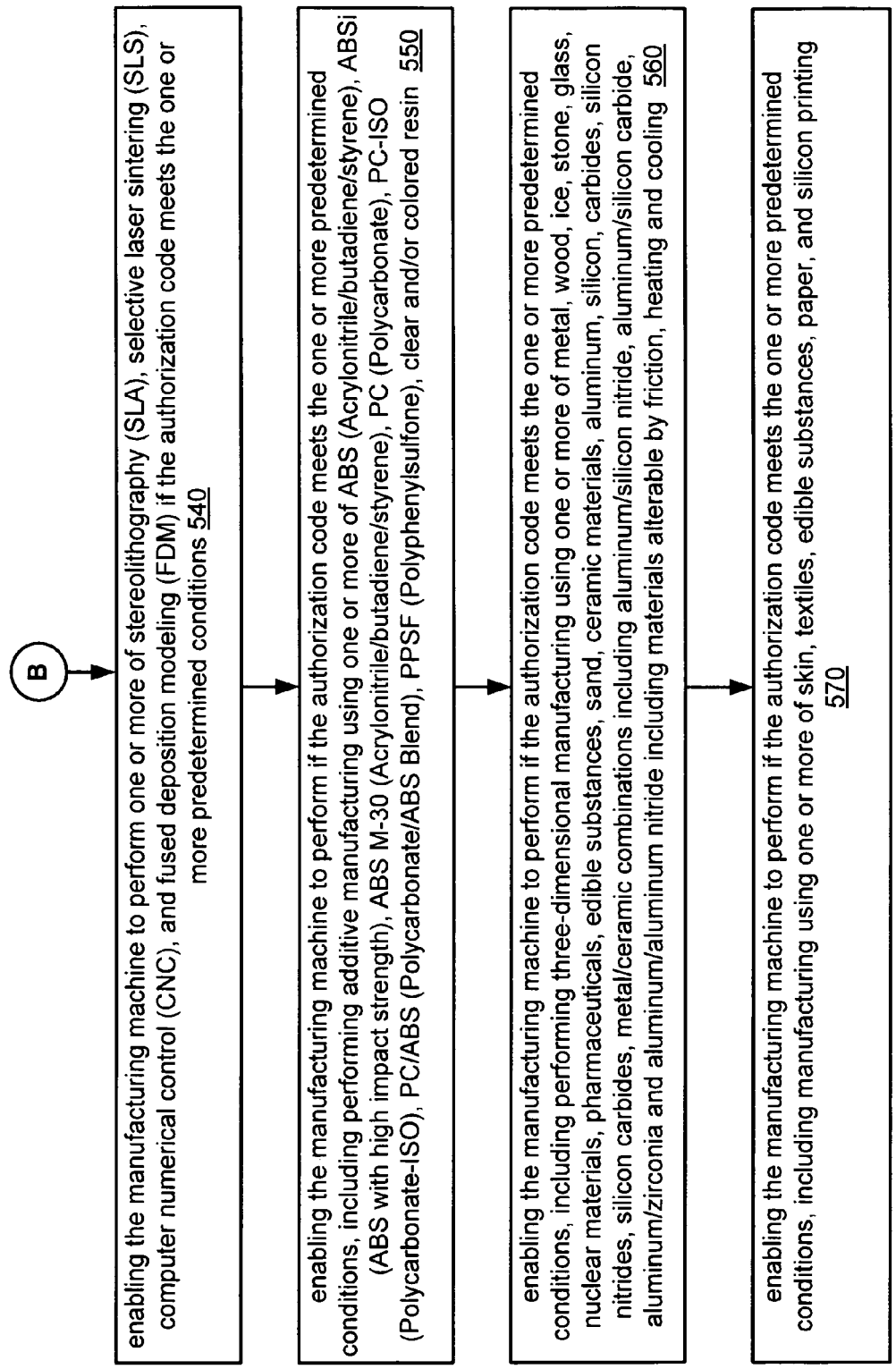

MANUFACTURING CONTROL SYSTEM

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 12/005,162 entitled CONTROL TECHNIQUE FOR OBJECT PRODUCTION RIGHTS, naming Edward K. Y. Jung, Royce A. Levien, Robert W. Lord, Mark A. Malamud, John D. Rinaldo, Jr., Clarence T. Tegreene, and Lowell L. Wood, Jr. as inventors, filed 21 Dec. 2007, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at the website of the USPTO at www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

BACKGROUND

The present application relates generally to secure manufacturing to control object production rights.

SUMMARY

In one aspect, a method for secure manufacturing to control object production rights includes but is not limited to identifying at least one object data file configured to produce an object by a manufacturing machine; confirming that an authorization code is associated with the object data file, the authorization code configured to be received by the manufacturing machine, the manufacturing machine adapted to receive the authorization code; and enabling the manufacturing machine to interface with the object data file only if the authorization code meets one or more predetermined conditions. In addition to the foregoing, other method aspects are described in the claims, drawings, and text forming a part of the present application.

In another aspect, a computer program product related to a control technique for object production rights includes but is not limited to a signal bearing medium bearing at least one of one or more instructions for identifying at least one object data file configured to produce an object by a manufacturing machine; one or more instructions for confirming that an authorization code is associated with the object data file, the authorization code configured to be received by the manufacturing machine, the manufacturing machine adapted to receive the authorization code; and one or more instructions for enabling the manufacturing machine to interface with the object data file only if the authorization code meets one or more predetermined conditions. In addition to the foregoing, other computer program product aspects are described in the claims, drawings, and text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a manufacturing control system for secure manufacturing includes a processor, a data store coupled to the processor, the data store configured to contain authorization guideline data including one or more authorization codes, the data store adapted for identifying at least one object data file configured to produce an object by a manufacturing machine; a confirmation module coupled to the processor, the confirmation module configured for confirming that an authorization code is associated with the object data file, the authorization code configured to be received by the manufacturing machine, the manufacturing machine adapted to receive the authorization code; and an authorization module coupled to the processor, the authorization module configured for enabling the manufacturing machine to interface with the object data file only if the authorization code meets one or more predetermined conditions. In addition to the foregoing, other control techniques for object production rights system aspects are described in the claims, drawings, and text forming a part of the present application.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 2 is a block diagram of an exemplary system that supports the claimed subject matter of the present application.

FIGS. 3A, 3B, 3C, and 3D illustrate a flow diagram of an exemplary method in accordance with an embodiment of the subject matter of the present application.

FIGS. 5A, 5B and 5C illustrate a flow diagram of an exemplary method in accordance with an embodiment of the subject matter of the present application.

DETAILED DESCRIPTION

Figure 1:
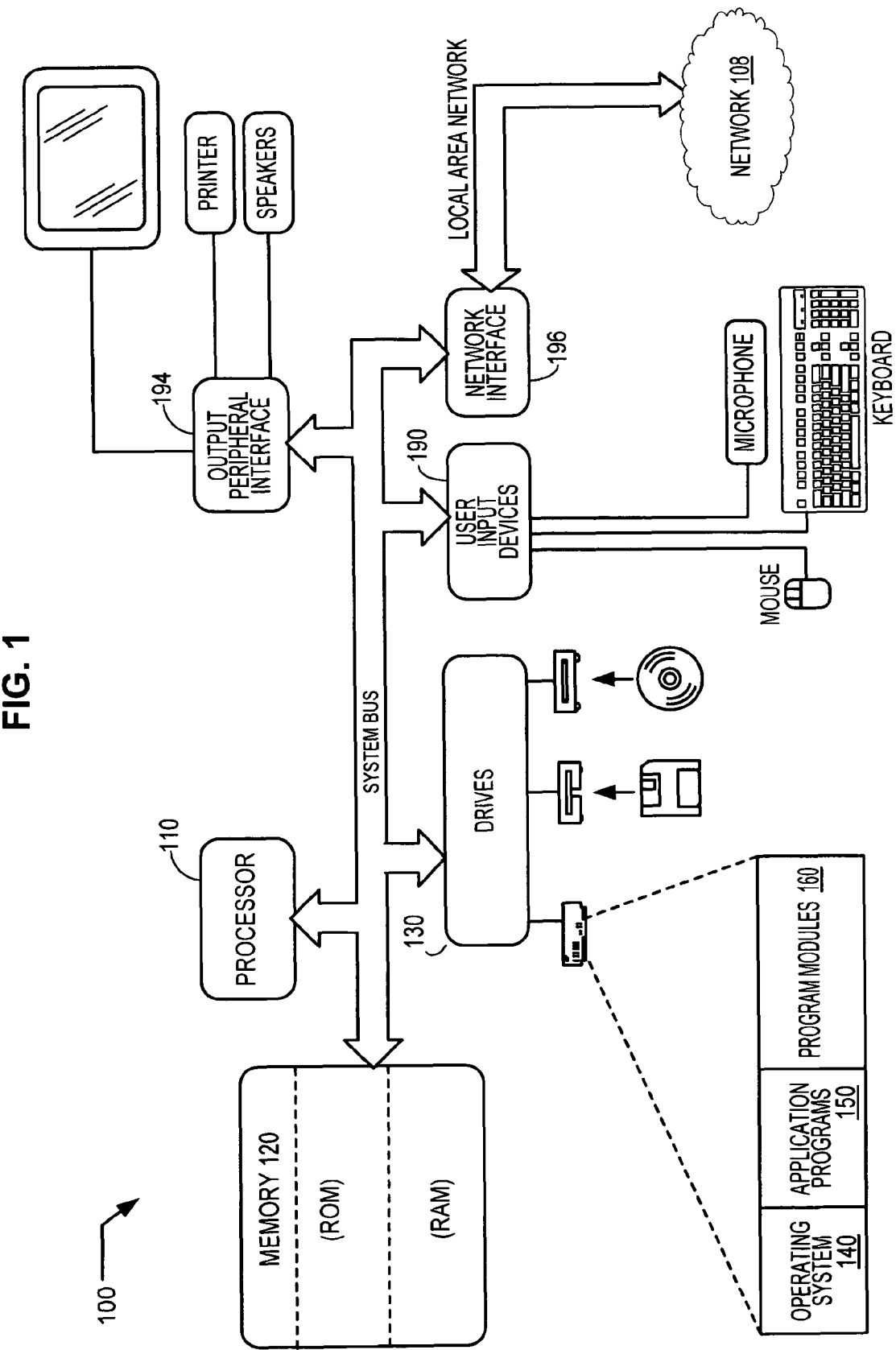
FIG. 1 is a block diagram of an exemplary computer architecture that supports the claimed subject matter of the present application.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those of skill in the art will appreciate that some of the acts and operations described hereinafter can also be implemented in hardware, software, and/or firmware and/or some combination thereof.

With reference to FIG. 1, depicted is an exemplary computing system for implementing embodiments. FIG. 1 includes a computer 100, including a processor 110, memory 120 and one or more drives 130. The drives 130 and their associated computer storage media, provide storage of computer readable instructions, data structures, program modules and other data for the computer 100. Drives 130 can include an operating system 140, application programs 150, and program modules 160. Computer 100 further includes user input devices 190 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be connected to processor 110 through a user input interface that is coupled to a system bus, but may be connected by other interface and bus structures, such as a parallel port, game port or a universal serial bus (USB). Computers such as computer 100 may also include other peripheral output devices such as speakers, which may be connected through an output peripheral interface 194 or the like.

Computer 100 may operate in a networked environment using logical connections to one or more computers, such as a remote computer connected to network interface 196 The remote computer may be a personal computer, a server, a router, a network PC, a peer device or other common network node, and can include many or all of the elements described above relative to computer 100. Networking environments are commonplace in offices, enterprise-wide area networks (WAN), local area networks (LAN), intranets and the Internet. For example, in the subject matter of the present application, computer 100 may comprise the source machine from which data is being migrated, and the remote computer may comprise the destination machine or vice versa. Note however, that source and destination machines need not be connected by a network 108 or any other means, but instead, data may be migrated via any media capable of being written by the source platform and read by the destination platform or platforms. When used in a LAN or WLAN networking environment, computer 100 is connected to the LAN through a network interface 196 or an adapter. When used in a WAN networking environment, computer 100 typically includes a modem or other means for establishing communications over the WAN, such as the Internet or network 108. It will be appreciated that other means of establishing a communications link between the computers may be used.

According to one embodiment, computer 100 is connected in a networking environment or a manufacturing machine either directly or via network 108 such that processor 110 and/or program modules 160 can perform a control technique for object production rights system capable of instantiating a digital rights management module in accordance with embodiments herein.

Referring now to FIG. 2, illustrated is an exemplary block diagram for an embodiment of a duplication control system 200 for implementing a control technique for object production rights system. As shown, duplication control system 200 includes a processor 210, a memory 220, coupled to the processor 210. FIG. 2 also illustrates a transceiver 230 which can be configured to send and receive one or more object data files or directly interact with a computing device 270 for receiving object data files. FIG. 2 also illustrates digital rights management module 240 accessible by processor 210 and by network 108 (see FIG. 1). FIG. 2 further illustrates a data store 250 coupled to processor 210. Digital rights management module 240 is configured to control digital rights for object data files. In one embodiment, digital rights management module 240 is coupled to comparison module 260, which can also be disposed within memory 220. In one embodiment, comparison module 260 compares the digital rights management codes to a stored list of digital rights management codes to determine the authorization status as a function of the status of one or more previously compiled object data files. Comparison module 260 can further interact with object data files residing in memory 252, outside of memory 253, or in data store as object data files 254. In one embodiment, object data files 252, 253 and/or 254 include one or more computer-aided design (CAD) solid model files configured to create three dimensional physical objects.

Data store 250 is configured to include authorization guideline data 256. In one embodiment, the authorization guideline data can include one digital certificates 2562, private/public key data 2564, one or more digital rights management codes 2566 for manufacturing machines, and/or digital rights management codes 2568. In one embodiment, authorization guideline data includes list 2569 which can be a list of digital rights management codes, a list of object data files, or any list that could be, for example, associated with multiple manufacturing machines 290 that require multiple authorization rights to be analyzed or the like. In one embodiment, list 2569 includes globally unique identifiers (GUID) that can function as digital rights management codes and provide cryptographic control over the one or more object data files.

In the embodiment in which data store 250 includes object data files 254, the object data files can be files that previously existed in data store 250, or can be files that were previously received by the duplication control system 200 via transceiver 230, memory 220, and/or network 108.

In one embodiment, data store 250 stores digital rights management codes separately from object data files, with the digital rights management codes decipherable with a public key, private key combination.

In another embodiment, manufacturing machines 290(1-n) can include an extrusion manufacturing machine, a melting manufacturing machine, a solidification manufacturing machine, an ejection manufacturing machine, a die casting manufacturing machine, and/or a stamping process machine.

In one embodiment, duplication control system 200 is coupled to each of the one or more manufacturing machines 290(1-n) to allow manufacture of an object described by the one or more object data files according to permissions provided in the one or more digital rights management codes.

In one embodiment, manufacturing machines 290(1-n) are three-dimensional additive manufacturing machines configured for rapid prototyping, three-dimensional printing, two-dimensional printing, freeform fabrication, solid freeform fabrication, and stereolithography.

In another embodiment, manufacturing machines 290(1-n) can include a subtractive manufacturing machine, including machines adapted for drilling, milling, turning, laser cutting, waterjet cutting, plasma cutting, wire electrical discharge cutting, cold, warm and hot forging metal fabrication, computer numerical controlled fabrication machine, and/or an additive manufacturing machine, and/or an injection molding machine.

In another embodiment, manufacturing machines 290(1-n) can include an extrusion manufacturing machine, a melting manufacturing machine, a solidification manufacturing machine, an ejection manufacturing machine, a die casting manufacturing machine, a stamping process machine.

In another embodiment, manufacturing machines 290(1-n) can include a subtractive manufacturing machine, including machines adapted for drilling, milling, turning, laser cutting, waterjet cutting, plasma cutting, wire electrical discharge cutting, cold, warm and hot forging metal fabrication, computer numerical controlled fabrication machine, and/or an additive manufacturing machine, and/or an injection molding machine.

In another embodiment, manufacturing machines 290(1-n) can include a manufacturing machine configured to perform manufacturing using one or more of metal, wood, ice, stone, glass, nuclear materials, pharmaceuticals, edible substances, sand, ceramic materials, aluminum, silicon, carbides, silicon nitrides, silicon carbides, metal/ceramic combinations including aluminum/silicon nitride, aluminum/silicon carbide, aluminum/zirconia and aluminum/aluminum nitride including materials alterable by friction, heating and cooling.

It will be understood that the illustrated system embodiments of FIGS. 1-2 are provided by way of example only, and are not intended to be limiting. Furthermore, it will be understood that the various process features and system components disclosed herein may be incorporated in different embodiment combinations depending on the circumstances.

Referring now to FIGS. 3A, 3B, 3C and 3D, an exemplary flow diagram illustrates the operation of a control technique for object production rights system according to one or more embodiments.

Figure 3A:

As illustrated in FIG. 3A, block 310 provides for receiving at the duplication control system a digital rights management code, the digital rights management code associated with one or more object data files (e.g., duplication control system 200 receiving digital rights management code associated with one or more object data files via computing deice 270, network 108, and/or manufacturing machine(s) 290(1-n)). Depicted within block 310 is optional block 3102, which provides for receiving the digital rights management code as digital rights management code decipherable with a public key, private key combination (e.g., a duplication control system 200 receiving one or more digital rights management code as cryptographically sealed code requiring a public key, private key pair).

Depicted within block 310 is optional block 3104, which provides for receiving the digital rights management code as a globally unique identifier (GUID) predetermined for an owner of the one or more object data files, the GUID providing cryptographic control over the one or more object data files (e.g., a duplication control system 200 receiving digital rights management code as a globally unique identifier (GUID) predetermined for an owner of the one or more object data files, the GUID providing cryptographic control from a manufacturing machine 290, and/or computer 100).

Depicted within block 3104 is optional block 31041 which provides for receiving the digital rights management code coupled to the one or more object data files (e.g., duplication control system 200 receiving digital rights management code coupled to one or more object data files).

Depicted within block 3104 is optional block 31042 which provides for receiving the digital rights management code separately from the one or more object data files (e.g., duplication control system 200 receiving digital rights management code in a separate transaction over transceiver 230).

Depicted within block 30142 is optional block 310422 which provides for receiving the digital rights management code coupled to the one or more object data files, the digital rights management code decipherable with a public key, private key combination (e.g., duplication control system 200 receiving digital rights management code over network 108, from computing device 270 and/or from manufacturing machine 290 (1-n) wherein the digital rights management code is protected by a public key, private key pair). In one embodiment the digital rights management codes can be a globally unique identifier (GUID) predetermined for an owner of the one or more object data files, the GUID providing cryptographic control over the one or more object data files. In other embodiments, the GUID can be associated with a public/private key pair.

Also depicted within block 3104 is optional block 31044, which provides for comparing the digital rights management code to a stored list of one or more digital rights management codes to determine if any of the one or more object data files are related to one or more previously compiled object data files (e.g., comparison module 260 performing comparisons of the digital management code with a stored list in data store 250 of digital rights management codes to determine if the object data files are related to one more previously compiled object data files, the object data files can be received via manufacturing machine 290(1-n), computing device 270 and/or computing device 280 over network 109). Optional block 31044 is coupled to optional block 31046 which provides for determining a status of the one or more previously compiled object data files (e.g., digital rights management module 240 determining a status of the previously compiled object data files).

Optional block 31046 is further coupled to optional block 31048 which provides for determining the authorization status as a function of a usage status of the one or more previously compiled object data files (e.g., digital rights management module 240 determining a status as a function of a usage status of the previously compiled object data files).

31048 includes optional block 310482 which provides for determining a usage status according to a compiling history of the object data files, the compiling history providing data related to a prior manufacturing history including one or more of a materials needs history, a manufacturing result history, and a manufacturing time (e.g., digital rights management module 240 determining a status of the previously compiled object data files received via network 108, computing device 270, manufacturing machines 290(1-n) and/or data store 250).

Block 31048 further depicts optional block 310484, which provides for determining a usage status according to a compiling history of the object data files, the compiling history providing data related to a prior manufacturing history including a trouble history affecting the authorization status (e.g., digital rights management module 240 determining a status of the previously compiled object data files compiling history and trouble history affecting an authorization status received via network 108, computing device 270, manufacturing machines 290(1-n) and/or data store 250).

Further depicted within block 31048 is optional block 310486 which provides for determining a usage status according to a compiling history of the object data files, the compiling history providing data related to a prior manufacturing history including a location of manufacturing history indicative of one or more of a number of locations of compilation and/or a number of compilations at a manufacturing location (e.g., digital rights management module 240 determining a number of locations of compilation and/or number of compilations of the previously compiled object data files received via network 108, computing device 270, manufacturing machines 290(1-n) and/or data store 250).

Optional block 31048 further depicts optional blocks 310488 and 310489. Optional block 310488 provides for determining a usage status according to a number of times the one or more object data files had been compiled (e.g., digital rights management module 240 determining a status of the previously compiled object data files received via network 108, computing device 270, manufacturing machines 290(1-n) and/or data store 250). Optional block 31049 provides for comparing the usage status with a permission associated with the digital rights management code (e.g., digital rights management module 240 determining a status of the previously compiled object data files received via network 108, computing device 270, manufacturing machines 290(1-n) and/or data store 250 and comparing via comparison module 260 a usage status with a permission associated with the digital rights management code).

Figure 3B:
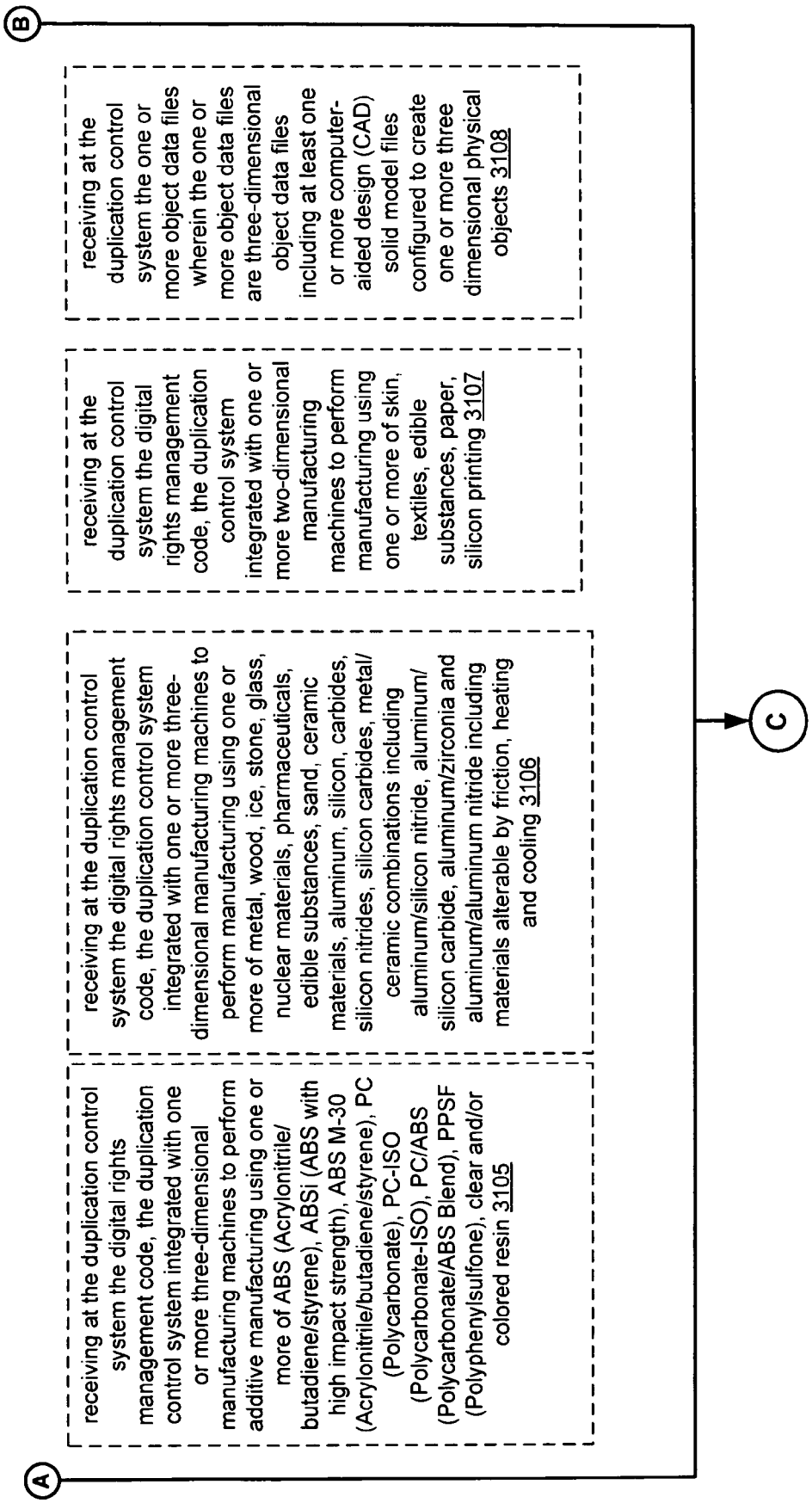

Referring now to FIG. 3B, the flow diagram depicting a method according to an embodiment continues. Specifically, block 310 further depicts optional block 3105, which provides for receiving at the duplication control system the digital rights management code, the duplication control system integrated with one or more three-dimensional manufacturing machines to perform additive manufacturing using one or more of ABS (Acrylonitrile/butadiene/styrene), ABSi (ABS with high impact strength), ABS M-30 (Acrylonitrile/butadiene/styrene), PC (Polycarbonate), PC-ISO (Polycarbonate-ISO), PC/ABS (Polycarbonate/ABS Blend), PPSF (Polyphenylsulfone), clear and/or colored resin (e.g., duplication control system 200 receiving digital rights management code, wherein duplication control system 200 is integrated with one or more of manufacturing machines 290(1-n) that perform three-dimensional manufacturing to perform additive manufacturing).

Block 310 further depicts optional block 3106, which provides for receiving at the duplication control system the digital rights management code, the duplication control system integrated with one or more three-dimensional manufacturing machines to perform manufacturing using one or more of metal, wood, ice, stone, glass, nuclear materials, pharmaceuticals, edible substances, sand, ceramic materials, aluminum, silicon, carbides, silicon nitrides, silicon carbides, metal/ceramic combinations including aluminum/silicon nitride, aluminum/silicon carbide, aluminum/zirconia and aluminum/aluminum nitride including materials alterable by friction, heating and cooling (e.g., duplication control system 200 receiving digital rights management code, wherein duplication control system 200 is integrated with one or more of manufacturing machines 290(1-n) that perform three-dimensional manufacturing to perform manufacturing of metal, wood, ice, stone, glass, nuclear materials, pharmaceuticals, edible substances, sand, ceramic materials, aluminum, silicon, carbides, silicon nitrides, silicon carbides, and/or metal/ceramic combinations).

Block 310 further depicts optional block 3107, which provides for receiving at the duplication control system the digital rights management code, the duplication control system integrated with one or more two-dimensional manufacturing machines to perform manufacturing using one or more of skin, textiles, edible substances, paper, silicon printing (e.g., duplication control system 200 receiving digital rights management code, wherein duplication control system 200 is integrated with one or more of manufacturing machines 290 (1-n) to perform two-dimensional manufacturing).

Block 310 further depicts optional block 3108, which provides for receiving at the duplication control system the one or more object data files wherein the one or more object data files are three-dimensional object data files including at least one or more computer-aided design (CAD) solid model files configured to create one or more three dimensional physical objects (e.g., duplication control system 200 receiving digital rights management code, wherein duplication control system 200 is integrated with one or more of manufacturing machines 290(1-n) to perform three-dimensional manufacturing of CAD files.

Referring now to FIG. 3C, the flow diagram depicting a method in accordance with an embodiment continues. Block 320 illustrates an aspect for generating an authorization status based on the digital rights management code (e.g., digital rights management module 240 generating the authorization status based on received or stored digital rights management code). Depicted within block 320 is optional block 3202 which provides for comparing the digital rights management code to a machine identifier associated with the one or more manufacturing machines to determine whether any of the one or more manufacturing machines is authorized to produce an object described in the object data files (e.g. comparison module 260 comparing the digital rights management code to a machine identifier supplied by one or more of manufacturing machines 290(1-n)).

Block 320 further depicts optional block 3204 which provides for comparing the digital rights management code to a database of digital rights management codes, the database providing the authorization status associated with the digital rights management code (e.g., comparison module 260 comparing the digital rights management code to a database in data store 250 storing digital rights management codes, including authorization status).

Depicted within optional block 3204 is optional block 32042 which provides for comparing the digital rights management code to the database of digital rights management codes to determine one or more of a licensing status, a royalty status, an expiration date pertaining to a license, and a number of manufacturing runs permitted according to a license (e.g., comparison module 260 comparing the digital rights management code to determine a licensing status, royalty status, expiration date, number of times a license permits a manufacturing run and the like).

Referring now to FIG. 3D, the flow diagram continues illustrating the method in accordance with an embodiment with block 330. Specifically, block 330 illustrates an aspect for configuring one or more manufacturing machines to operate as a function of the authorization status (e.g., processor 210 and digital rights management module configuring one or more manufacturing machines 290(1-n) to operate in accordance with the authorization status determined by comparison module 260).

Depicted within block 330 is optional block 3302 which provides for enabling the one or more manufacturing machines to operate if the authorization status provides permission for operation wherein the one or more manufacturing machines perform one or more of rapid prototyping, three-dimensional printing, two-dimensional printing, freeform fabrication, solid freeform fabrication, and stereolithography (e.g., digital rights management module 240 interacting with one or more of manufacturing machines 290(1-n) to operate according the authorization status).

Also depicted within block 330 is optional block 3304 which provides for enabling the one or more manufacturing machines to operate if the authorization status provides permission for operation wherein the one or more manufacturing machines include a subtractive manufacturing machine, including machines adapted for drilling, milling, turning, laser cutting, waterjet cutting, plasma cutting, wire electrical discharge cutting, cold, warm and hot forging metal fabrication, computer numerical controlled fabrication machine, and/or an additive manufacturing machine, and/or an injection molding machine (e.g., digital rights management module 240 interacting with the one or more manufacturing machines 290(1-n) to operate if the authorization status provides permission for operation, the one or more manufacturing machines 290(1-n) including subtractive manufacturing machines).

Further depicted within block 330 is optional block 3306 which provides for enabling the one or more manufacturing machines to operate if the authorization status provides permission for operation wherein the one or more manufacturing machines include one or more of an extrusion manufacturing machine, a melting manufacturing machine, a solidification manufacturing machine, an ejection manufacturing machine, a die casting manufacturing machine, a stamping process machine (e.g., digital rights management module 240 interacting with the one or more manufacturing machines 290(1-n) to operate if the authorization status provides permission for operation, the one or more manufacturing machines 290(1-n) can include an extrusion manufacturing machine, a melting manufacturing machine, a solidification manufacturing machine, an ejection manufacturing machine, a die casting manufacturing machine, a stamping process machine or the like).

Figure 4:
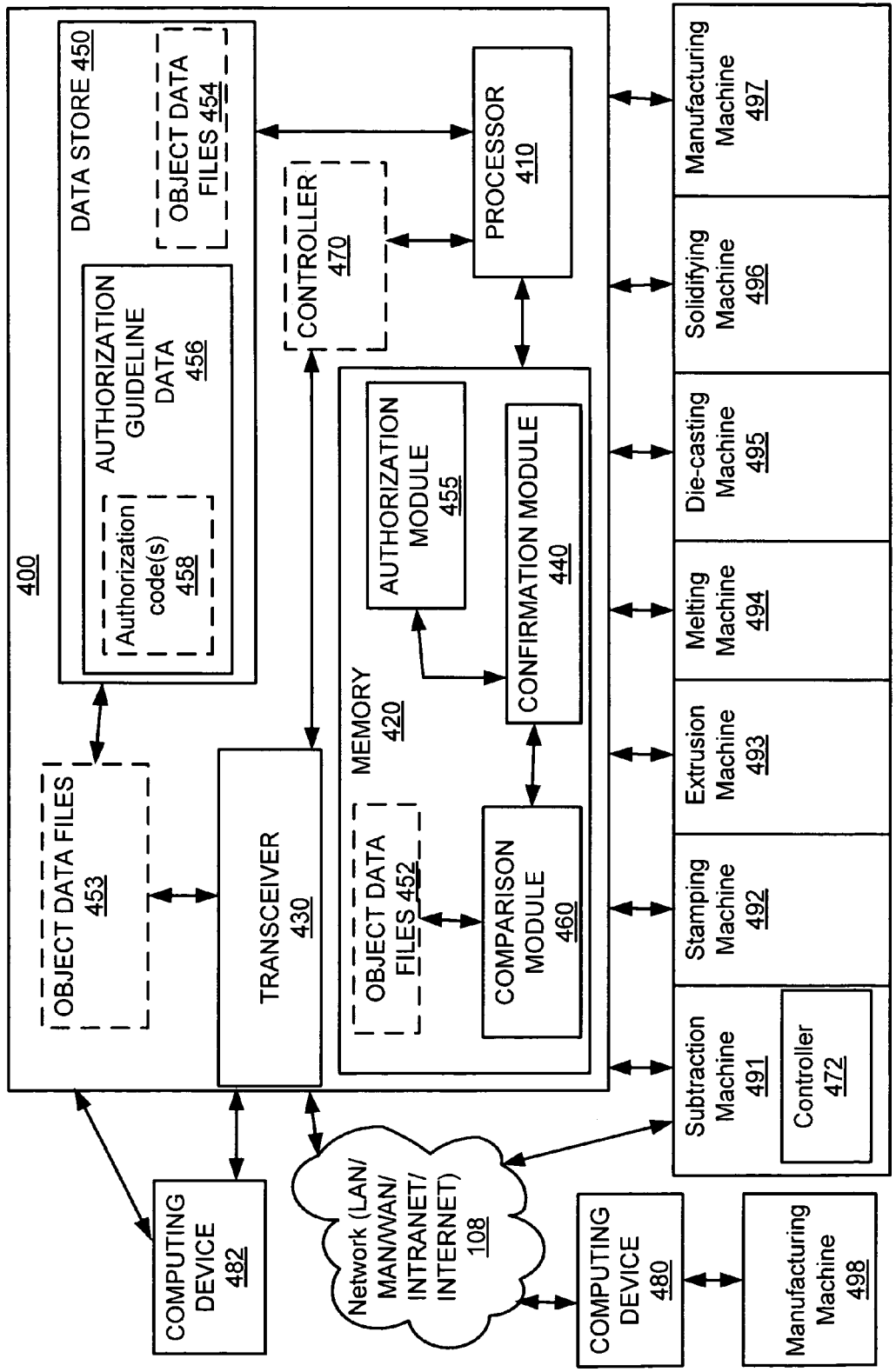
FIG. 4 is a block diagram of an exemplary system that supports the claimed subject matter of the present application.

Referring now to the schematic depiction of FIG. 4, illustrated is an exemplary block diagram for an embodiment of a manufacturing control system 400 for controlling digital production rights for producing a physical object. As shown, manufacturing control system 400 includes a memory 420 coupled to the processor 410. Manufacturing control system 400 further includes transceiver 430 that is shown to be coupled through optional controller 470 to processor 410. FIG. 4 also illustrates transceiver 430 which can be configured to send and receive one or more object data files or directly interact with a computing device 482 for receiving object data files. FIG. 4 also illustrates digital rights confirmation module 440 accessible by processor 410 and by network 108 (see FIG. 1). FIG. 4 further illustrates a data store 450 and an authorization module 455 coupled to processor 410.

Digital rights confirmation module 440 is configured to control digital rights for object data files 452, 453 and/or 454. Authorization module 455 is configured for enabling a manufacturing machine (e.g., manufacturing machines 497, 498) to interface with an object data file only if an authorization code 458 meets one or more predetermined conditions. In one embodiment, digital rights confirmation module 440 is coupled to authorization module 455 and to comparison module 460, which can also be disposed within memory 420. In one embodiment, comparison module 460 compares one or more authorization codes to a stored list of digital rights management codes to determine the authorization status as a function of the status of one or more previously compiled object data files. Comparison module 460 can further interact with object data files 452, object data files 453, or object data files 454. In one embodiment, object data files 452, 453 and/or 454 include one or more computer-aided design (CAD) solid model files configured to create three dimensional physical objects. In other embodiments the object data files are configured to create two-dimensional objects, renderings, prototypes and the like.

Data store 450 is configured to include authorization guideline data 456 such as authorization code(s) 458 or other digital rights authorization data. In the embodiment in which data store 450 includes object data files 454, the object data files can be files that previously existed in data store 450, or can be files that were previously received by the manufacturing control system 400 via transceiver 430, memory 420, and/or network 108.

FIG. 4 further illustrates manufacturing machines coupled to control system 400. Specifically, manufacturing control system 400 is illustrated coupled to subtraction machine 491, stamping machine 492, extrusion machine 493, melting machine 494, die-casting machine 495, solidifying machine 496, and generic manufacturing machine 497. Manufacturing control system 400 is further coupled to manufacturing machine 498 via network 108 and computing device 480. In one embodiment, subtraction machine 491 can be configured with a controller 472 and be alternatively coupled to manufacturing control system via network 108 or directly. Subtraction machine 491 illustrates an exemplary manufacturing machine with a controller 472 to control digital production rights directly and/or over a network connection. Likewise, manufacturing machine 498 could be coupled to a controller located in computing device 480 or receive control directions from manufacturing control system 400. Each of manufacturing machines 491-498 can allow manufacture of an object described by the one or more object data files as directed by manufacturing control system 400 and controllers 470 and 472.

As shown, manufacturing machines 491-498 can be three-dimensional additive manufacturing machines configured for rapid prototyping, three-dimensional printing, two-dimensional printing, freeform fabrication, solid freeform fabrication, and stereolithography.

Manufacturing machines 491-498 include a subtractive manufacturing machine 491, which can be adapted for drilling, milling, turning, laser cutting, waterjet cutting, plasma cutting, wire electrical discharge cutting, cold, warm and hot forging metal fabrication, computer numerical controlled fabrication machine, and/or an additive manufacturing machine, and/or an injection molding machine.

Manufacturing machines 491-498 are shown including an extrusion manufacturing machine 493, a melting manufacturing machine 494, a solidification manufacturing machine 496, a die casting manufacturing machine 495, a stamping process machine 492, and a generic manufacturing machine 497 which can be configured as an ejection manufacturing machine.

In another embodiment, manufacturing machines 497 and/or 498 can be configured to perform manufacturing using one or more of metal, wood, ice, stone, glass, nuclear materials, pharmaceuticals, edible substances, sand, ceramic materials, aluminum, silicon, carbides, silicon nitrides, silicon carbides, metal/ceramic combinations including aluminum/silicon nitride, aluminum/silicon carbide, aluminum/zirconia, aluminum/aluminum nitride including materials alterable by friction, heating and cooling.

In another embodiment, manufacturing machines 497 and/or 498 can include a manufacturing machine configured as two-dimensional manufacturing machines configured to perform manufacturing of one or more of skin, textiles, edible substances, paper and/or silicon printing.

Figure 5A:
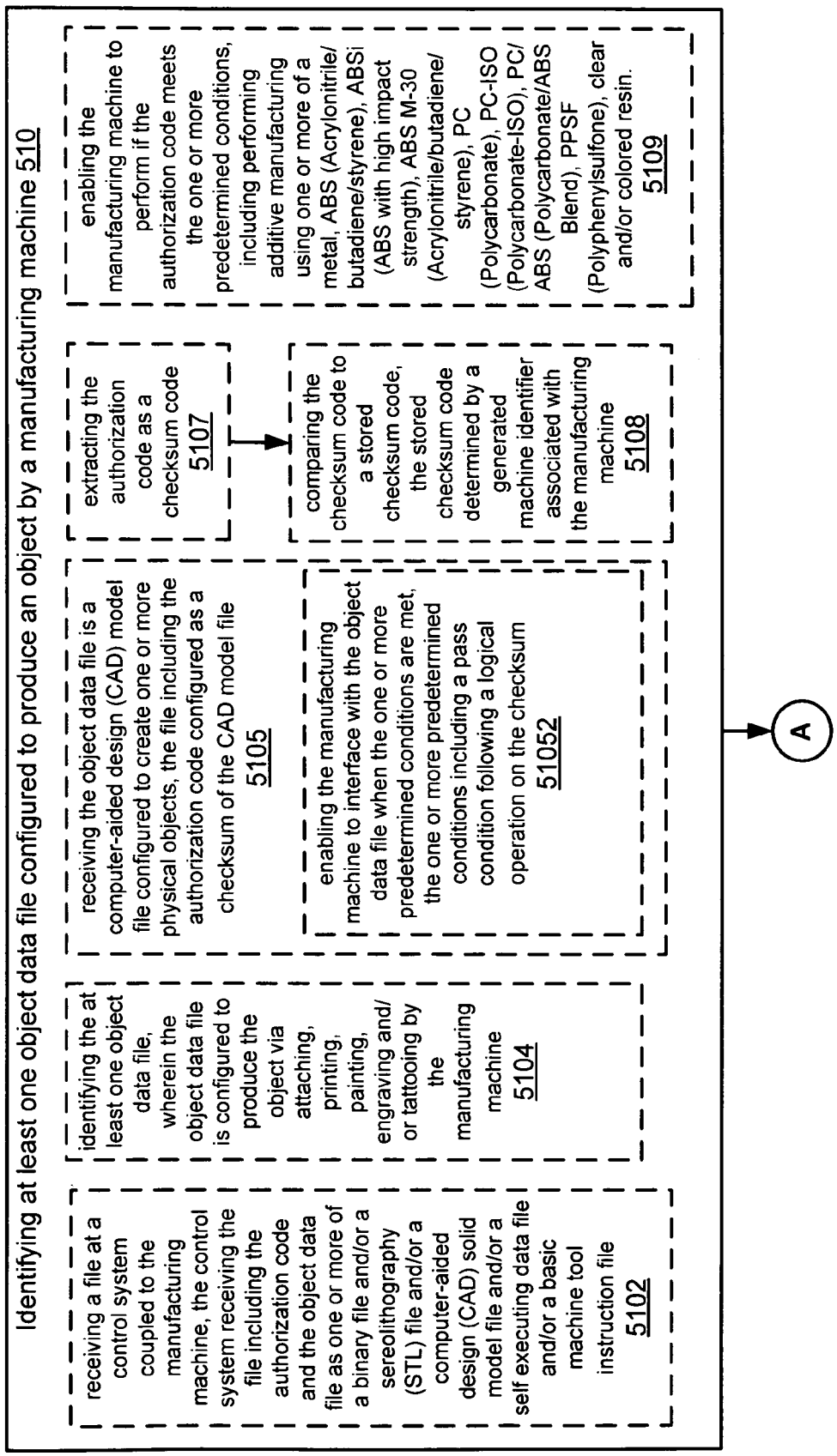
Figure 5B:
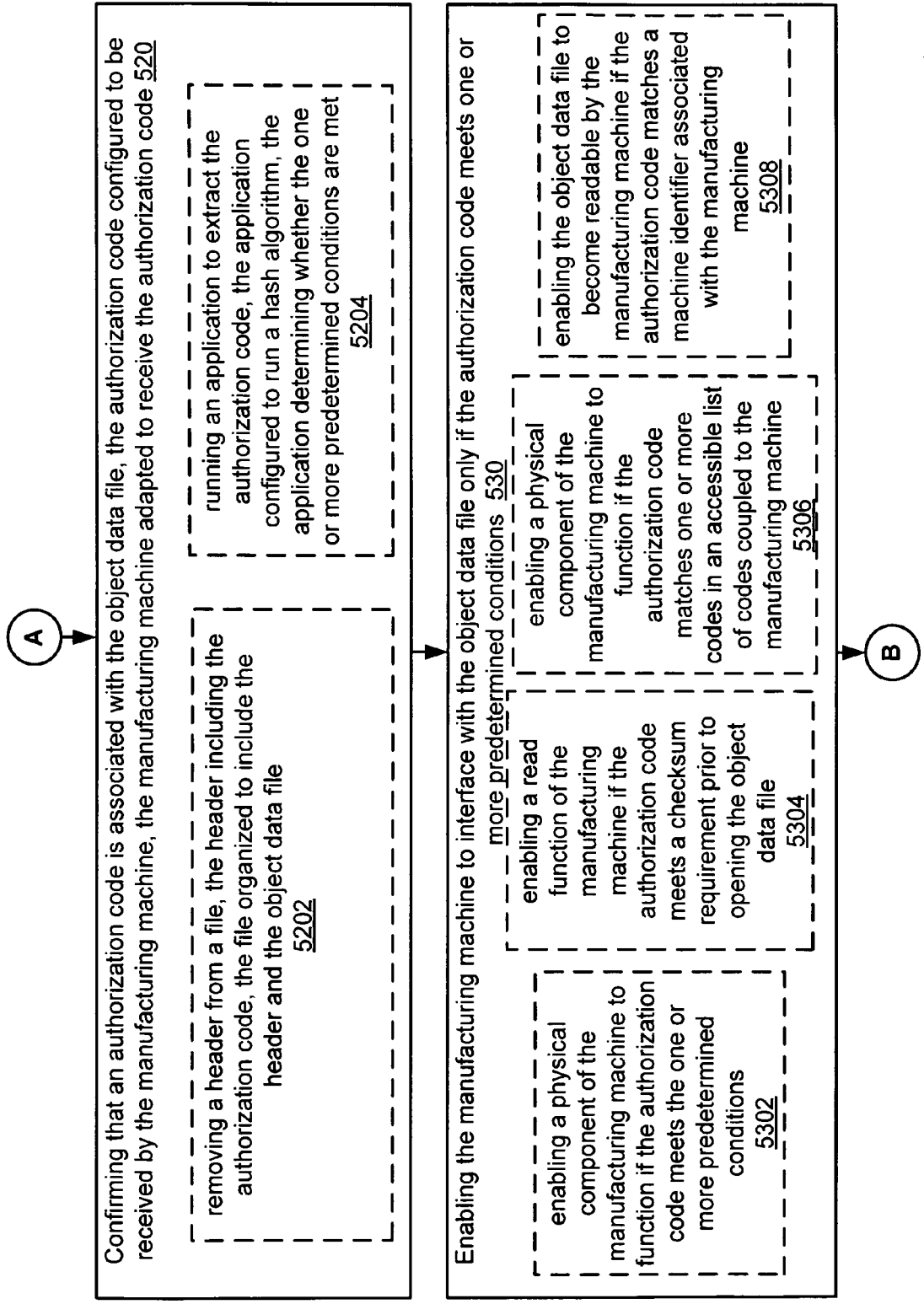

Referring now to FIGS. 5A, 5B and 5C, a flow diagram illustrates a method in accordance with an embodiment. Block 510 provides for identifying at least one object data file configured to produce an object by a manufacturing machine (e.g., controller 470 and/or 472 identifying object data files 452, 453, 454 to produce an object by manufacturing machines 497, 498, and/or subtraction machine 491, stamping machine 492, extrusion machine 493, melting machine 494, die-casting machine 495 and/or solidifying machine 496). Disposed within block 510 is optional block 5102 which provides for receiving a file at a control system coupled to the manufacturing machine, the control system receiving the file including the authorization code and the object data file as one or more of a binary file and/or a stereolithography (STL) file and/or a computer-aided design (CAD) solid model file and/or a self executing data file and/or a basic machine tool instruction file (e.g., transceiver 430 in control system 400 receiving object data files 452, 453, 454). Further disposed in block 510 is optional block 5104 which provides for identifying the at least one object data file, wherein the object data file is configured to produce the object via attaching, printing, painting, engraving and/or tattooing by the manufacturing machine (e.g., transceiver 430 and control system 400 identifying object data files 452, 453, 454). Further disposed in block 510 is block 5105 which provides for receiving the object data file as a computer-aided design (CAD) model file configured to create one or more physical objects, the object data file including the authorization code configured as a checksum of the CAD model file (e.g., transceiver 430 receiving object data files 452, 453, 454 including authorization code configured as a checksum of a CAD model file).

Disposed within block 5105 is optional block 51052, which provides for enabling the manufacturing machine to interface with the object data file when the one or more predetermined conditions are met, the one or more predetermined conditions including a pass condition following a logical operation on the checksum (e.g., controller 470, controller 472 and/or processor 410 enabling manufacturing machines 497, 498, and/or subtraction machine 491, stamping machine 492, extrusion machine 493, melting machine 494, die-casting machine 495 and/or solidifying machine 496 to interface with object data files 452, 453, and/or 454 when predetermined conditions are met, including a pass condition).

Further disposed in block 510 is optional block 5107 and optional block 5108. Optional block 5107 provides for extracting the authorization code as a checksum code (e.g., processor 410, controller 470 and/or controller 472 extracting authorization code from object data files 452, 453 and/or 454). Optional block 5108 provides for comparing the checksum code to a stored checksum code, the stored checksum code determined by a generated machine identifier associated with the manufacturing machine (e.g. comparison module 460 comparing checksum code to checksum code stored in data store 450 and/or manufacturing machines 497, 498, and/or subtraction machine 491, stamping machine 492, extrusion machine 493, melting machine 494, die-casting machine 495 and/or solidifying machine 496).

Further disposed in block 510 is optional block 5109 which provides for enabling the manufacturing machine to perform if the authorization code meets the one or more predetermined conditions, including performing additive manufacturing using one or more of a metal, ABS (Acrylonitrile/butadiene/styrene), ABSi (ABS with high impact strength), ABS M-30 (Acrylonitrile/butadiene/styrene), PC (Polycarbonate), PC-ISO (Polycarbonate-ISO), PC/ABS (Polycarbonate/ABS Blend), PPSF (Polyphenylsulfone), clear and/or colored resin (e.g., controller 470, 472 and/or control system 400 enabling manufacturing machines 497, 498, and/or subtraction machine 491, stamping machine 492, extrusion machine 493, melting machine 494, die-casting machine 495 and/or solidifying machine 496 to perform if the authorization code meets the one or more predetermined conditions).

Block 520 provides for confirming that an authorization code is associated with the object data file, the authorization code configured to be received by the manufacturing machine, the manufacturing machine adapted to receive the authorization code (e.g. controller 470 and/or 472 and/or manufacturing control system 400 confirming that an authorization code is associated with one or more of object data files 452, 453, and/or 454 to be received by one or more of manufacturing machines 491-498. Depicted within block 520 is optional block 5202 which provides for removing a header from a file, the header including the authorization code, the file organized to include the header and the object data file (e.g. processor 410 removing a header from one or more of object data files 452, 453 and/or 454, the header including the authorization code). Further depicted in block 520 is optional block 5204 which provides for running an application to extract the authorization code, the application configured to run a hash algorithm, the application determining whether the one or more predetermined conditions are met (e.g., processor 410 running an application stored in memory 420 to extract an authorization code from one or more of object data files 452, 453, and/or 454).

Block 530 provides for enabling the manufacturing machine to interface with the object data file only if the authorization code meets one or more predetermined conditions (e.g., controller 470, 472 and/or control system 400 enabling manufacturing machines 497, 498, and/or subtraction machine 491, stamping machine 492, extrusion machine 493, melting machine 494, die-casting machine 495 and/or solidifying machine 496 to interface with object data files 452, 453, and/or 454 only if the authorization code meets one or more predetermined conditions). Depicted within block 530 is optional block 5302 which provides for enabling a physical component of the manufacturing machine to function if the authorization code meets the one or more predetermined conditions (e.g., controller 470, 472 and/or control system 400 enabling physical component within or attached to manufacturing machines 497, 498, and/or subtraction machine 491, stamping machine 492, extrusion machine 493, melting machine 494, die-casting machine 495 and/or solidifying machine 496 to function if the authorization code meets predetermined conditions). Also depicted within block 530 is optional block 5304, which provides for enabling a read function of the manufacturing machine if the authorization code meets a checksum requirement prior to opening the object data file (e.g., controller 470, 472 and/or control system 400 enabling a read function of manufacturing machines 497, 498, and/or subtraction machine 491, stamping machine 492, extrusion machine 493, melting machine 494, die-casting machine 495 and/or solidifying machine 496 if the authorization code meets a checksum requirement). Further depicted within block 530 is optional block 5306 which provides for enabling a physical component of the manufacturing machine to function if the authorization code matches one or more codes in an accessible list of codes coupled to the manufacturing machine (e.g., controller 470, 472 and/or control system 400 enabling a physical component of manufacturing machines 497, 498, and/or subtraction machine 491, stamping machine 492, extrusion machine 493, melting machine 494, die-casting machine 495 and/or solidifying machine 496 if the authorization code matches an accessible list of codes). Further depicted within block 530 is optional 5308 which provides for enabling the object data file to become readable by the manufacturing machine if the authorization code matches a machine identifier associated with the manufacturing machine (e.g., controller 470, 472 and/or control system 400 enabling one or more of object data files 452, 453, and/or 454 to become readable by one or more of manufacturing machines 497, 498, and/or subtraction machine 491, stamping machine 492, extrusion machine 493, melting machine 494, die-casting machine 495 and/or solidifying machine 496 if the authorization code matches a machine identifier associated with the one or more manufacturing machines 491- 498).

Block 540 provides for enabling the manufacturing machine to perform one or more of stereolithography (SLA), selective laser sintering (SLS), computer numerical control (CNC), and fused deposition modeling (FDM) if the authorization code meets the one or more predetermined conditions (e.g., controller 470, 472 and/or control system 400 enabling one or more of manufacturing machines 497, 498, and/or subtraction machine 491, stamping machine 492, extrusion machine 493, melting machine 494, die-casting machine 495 and/or solidifying machine 496 to perform one or more of stereolithography (SLA), selective laser sintering (SLS), computer numerical control (CNC), and fused deposition modeling (FDM) if the authorization code meets the one or more predetermined conditions).

Block 550 provides for enabling the manufacturing machine to perform if the authorization code meets the one or more predetermined conditions, including performing additive manufacturing using one or more of ABS (Acrylonitrile/butadiene/styrene), ABSi (ABS with high impact strength), ABS M-30 (Acrylonitrile/butadiene/styrene), PC (Polycarbonate), PC-ISO (Polycarbonate-ISO), PC/ABS (Polycarbonate/ABS Blend), PPSF (Polyphenylsulfone), clear and/or colored resin (e.g., controller 470, 472 and/or control system 400 enabling one or more of manufacturing machines 497, 498, and/or subtraction machine 491, stamping machine 492, extrusion machine 493, melting machine 494, die-casting machine 495 and/or solidifying machine 496 to perform if the authorization code meets the one or more predetermined conditions).

Block 560 provides for enabling the manufacturing machine to perform if the authorization code meets the one or more predetermined conditions, including performing three-dimensional manufacturing using one or more of metal, wood, ice, stone, glass, nuclear materials, pharmaceuticals, edible substances, sand, ceramic materials, aluminum, silicon, carbides, silicon nitrides, silicon carbides, metal/ceramic combinations including aluminum/silicon nitride, aluminum/silicon carbide, aluminum/zirconia and aluminum/aluminum nitride including materials alterable by friction, heating and cooling (e.g., controller 470, 472 and/or control system 400 enabling one or more of manufacturing machines 497, 498, and/or subtraction machine 491, stamping machine 492, extrusion machine 493, melting machine 494, die-casting machine 495 and/or solidifying machine 496 to perform if the authorization code meets the one or more predetermined conditions).

Block 570 provides for enabling the manufacturing machine to perform if the authorization code meets the one or more predetermined conditions, including manufacturing using one or more of skin, textiles, edible substances, paper, and silicon printing (e.g. controller 470, 472 and/or control system 400 enabling one or more of manufacturing machines 497, 498, and/or subtraction machine 491, stamping machine 492, extrusion machine 493, melting machine 494, die-casting machine 495 and/or solidifying machine 496 to perform if the authorization code meets the one or more predetermined conditions).

Those with skill in the computing arts will recognize that the disclosed embodiments have relevance to a wide variety of applications and architectures in addition to those described above. In addition, the functionality of the subject matter of the present application can be implemented in software, hardware, or a combination of software and hardware. The hardware portion can be implemented using specialized logic; the software portion can be stored in a memory or recording medium and executed by a suitable instruction execution system such as a microprocessor.

While the subject matter of the application has been shown and described with reference to particular embodiments thereof, it will be understood by those skilled in the art that the foregoing and other changes in form and detail may be made therein without departing from the spirit and scope of the subject matter of the application, including but not limited to additional, less or modified elements and/or additional, less or modified blocks performed in the same or a different order.

Those having skill in the art will recognize that the state of the art has progressed to the point where there is little distinction left between hardware and software implementations of aspects of systems. The use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, Specific examples of operably couplable include but are not limited to physically mateable and/or physically interacting components and/or wirelessly interactable and/or wirelessly interacting components and/or logically interacting and/or logically interactable components.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into comprehensive devices and/or processes and/or systems via a reasonable amount of experimentation. Those having skill in the art will recognize that examples of such comprehensive devices and/or processes and/or systems might include, as appropriate to context and application, all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc.); or (g) a wired/wireless services entity such as Sprint, Cingular, Nextel, etc.), etc.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skilled in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skills in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for secure manufacturing to control object production rights, the method comprising:
    identifying at least one object data file configured to produce an object by a manufacturing machine;
    confirming that an authorization code is associated with the object data file, the authorization code configured to be received by the manufacturing machine, the manufacturing machine adapted to receive the authorization code; and
    enabling the manufacturing machine to interface with the object data file only if the authorization code meets one or more predetermined conditions,
    wherein the manufacturing machine is configured for at least one or more of additive manufacturing, subtractive manufacturing, extrusion manufacturing, melting manufacturing, solidification manufacturing, ejection manufacturing, die casting, or a stamping process.

2. The method of claim 1 wherein the identifying at least one object data file configured to produce an object by a manufacturing machine includes:
    receiving a file at a control system coupled to the manufacturing machine, the control system receiving the file including the authorization code and the object data file as one or more of a binary file and/or a stereolithography (STL) file and/or a computer-aided design (CAD) solid model file and/or a self executing data file and/or a basic machine tool instruction file.

3. The method of claim 1 wherein the identifying at least one object data file configured to produce an object by a manufacturing machine includes:
    identifying the at least one object data file, wherein the object data file is configured to produce the object via attaching, printing, painting, engraving and/or tattooing by the manufacturing machine.

4. The method of claim 1 wherein the identifying at least one object data file configured to produce an object by a manufacturing machine includes:
    receiving the object data file as a computer-aided design (CAD) model file configured to create one or more physical objects, the object data file including the authorization code configured as a checksum of the CAD model file.

5. The method of claim 4 wherein the receiving the object data file as a computer-aided design (CAD) model file configured to create one or more physical objects, the object data file including the authorization code configured as a checksum of the CAD model file includes:
    enabling the manufacturing machine to interface with the object data file when the one or more predetermined conditions are met, the one or more predetermined conditions including a pass condition following a logical operation on the checksum.

6. The method of claim 1 wherein the confirming that an authorization code is associated with the object data file, the authorization code configured to be received by the manufacturing machine, the manufacturing machine adapted to receive the authorization code includes one or more of:
    extracting the authorization code as a checksum code; and
    comparing the checksum code to a stored checksum code, the stored checksum code determined by a generated machine identifier associated with the manufacturing machine.

7. The method of claim 1 wherein the enabling the manufacturing machine to interface with the object data file only if the authorization code meets one or more predetermined conditions includes:
    enabling the manufacturing machine to perform if the authorization code meets the one or more predetermined conditions, including performing additive manufacturing using one or more of a metal, ABS (Acrylonitrile/butadiene/styrene), ABSi (ABS with high impact strength), ABS M-30 (Acrylonitrile/butadiene/styrene), PC (Polycarbonate), PC-ISO (Polycarbonate-ISO), PC/ABS (Polycarbonate/ABS Blend), PPSF (Polyphenylsulfone), clear and/or colored resin.

8. The method of claim 1 wherein the confirming that an authorization code is associated with the object data file, the authorization code configured to be received by the manufacturing machine, the manufacturing machine adapted to receive the authorization code includes:
    removing a header from a file, the header including the authorization code, the file organized to include the header and the object data file.

9. The method of claim 1 wherein the confirming that an authorization code is associated with the object data file, the authorization code configured to be received by the manufacturing machine, the manufacturing machine adapted to receive the authorization code includes:
    running an application to extract the authorization code, the application configured to run a hash algorithm, the application determining whether the one or more predetermined conditions are met.

10. The method of claim 1 wherein the enabling the manufacturing machine to interface with the object data file only if the authorization code meets one or more predetermined conditions includes:
    enabling a physical component of the manufacturing machine to function if the authorization code meets the one or more predetermined conditions.

11. The method of claim 1 wherein the enabling the manufacturing machine to interface with the object data file only if the authorization code meets one or more predetermined conditions includes:
    enabling a read function of the manufacturing machine if the authorization code meets a checksum requirement prior to opening the object data file.

12. The method of claim 1 wherein the enabling the manufacturing machine to interface with the object data file only if the authorization code meets one or more predetermined conditions includes:
    enabling a physical component of the manufacturing machine to function if the authorization code matches one or more codes in an accessible list of codes coupled to the manufacturing machine.

13. The method of claim 1 wherein the enabling the manufacturing machine to interface with the object data file only if the authorization code meets one or more predetermined conditions includes:
   enabling the object data file to become readable by the manufacturing machine if the authorization code matches a machine identifier associated with the manufacturing machine.

14. The method of claim 1 further comprising:
   enabling the manufacturing machine to perform one or more of stereolithography (SLA), selective laser sintering (SLS), computer numerical control (CNC), and fused deposition modeling (FDM) if the authorization code meets the one or more predetermined conditions.

15. The method of claim 1 further comprising:
   enabling the manufacturing machine to perform if the authorization code meets the one or more predetermined conditions, including performing additive manufacturing using one or more of ABS (Acrylonitrile/butadiene/styrene), ABSi (ABS with high impact strength), ABS M-30 (Acrylonitrile/butadiene/styrene), PC (Polycarbonate), PC-ISO (Polycarbonate-ISO), PC/ABS (Polycarbonate/ABS Blend), PPSF (Polyphenylsulfone), clear and/or colored resin.

16. The method of claim 1 further comprising:
   enabling the manufacturing machine to perform if the authorization code meets the one or more predetermined conditions, including performing three-dimensional manufacturing using one or more of metal, wood, ice, stone, glass, nuclear materials, pharmaceuticals, edible substances, sand, ceramic materials, aluminum, silicon, carbides, silicon nitrides, silicon carbides, metal/ceramic combinations including aluminum/silicon nitride, aluminum/silicon carbide, aluminum/zirconia and aluminum/aluminum nitride including materials alterable by friction, heating and cooling.

17. The method of claim 1 further comprising:
   enabling the manufacturing machine to perform if the authorization code meets the one or more predetermined conditions, including manufacturing using one or more of skin, textiles, edible substances, paper, and silicon printing.

18. The method of claim 1 wherein one or more digital rights management codes is associated with the at least one object data file.

19. The method of claim 18 wherein the manufacturing machine is enabled to perform as a function of an authorization status based on the one or more digital rights management codes, the authorization status being provided by a database of digital rights management codes.

20. The method of claim 19 wherein the authorization status is determined by a licensing status.

21. The method of claim 19 wherein the authorization status is determined by a royalty status.

22. The method of claim 19 wherein the authorization status is determined by an expiration date.

23. The method of claim 19 wherein the authorization status is determined by a number of manufacturing runs permitted according to a license.

24. The method of claim 18, wherein the one or more digital rights management codes includes a GUID predetermined for an owner of the at least one object data files.

25. The method of claim 24, wherein the enabling the manufacturing machine to interface with the object data file only if the authorization code meets one or more predetermined conditions comprises:
   enabling the manufacturing machine to interface with the object data file only if the GUID predetermined for an owner of the object data file is associated with the object data file.

26. A computer program product comprising a non-transitory computer readable medium configured to perform one or more acts for performing secure manufacturing, the one or more acts comprising:
   one or more instructions for identifying at least one object data file configured to produce an object by a manufacturing machine;
   one or more instructions for confirming that an authorization code is associated with the object data file, the authorization code configured to be received by the manufacturing machine, the manufacturing machine adapted to receive the authorization code;
   one or more instructions for enabling the manufacturing machine to interface with the object data file only if the authorization code meets one or more predetermined conditions,
   wherein the manufacturing machine is configured for at least one or more of additive manufacturing, subtractive manufacturing, extrusion manufacturing, melting manufacturing, solidification manufacturing, ejection manufacturing, die casting, or a stamping process.

27. The computer program product of claim 26 further comprising signal-bearing storage media for encoding the instructions for executing the one or more acts for performing secure additive manufacturing.

28. The computer program product of claim 26 further comprising signal-bearing communication media for encoding the instructions for executing the one or more acts for performing the secure additive manufacturing.

29. The computer program product of claim 26 wherein the one or more instructions for identifying at least one object data file configured to produce an object by a manufacturing machine includes:
   one or more instructions for receiving a file at a control system coupled to the manufacturing machine, the control system receiving the file including the authorization code and the object data file as one or more of a binary file and/or a stereolithography (STL) file and/or a computer-aided design (CAD) solid model file and/or a self executing data file and/or a basic machine tool instruction file.

30. The computer program product of claim 26 wherein the one or more instructions for identifying at least one object data file configured to produce an object by a manufacturing machine includes:
   one or more instructions for identifying the at least one object data file, wherein the object data file is configured to produce the object via attaching, printing, painting, engraving and/or tattooing by the manufacturing machine.

31. The computer program product of claim 26 wherein the one or more instructions for identifying at least one object data file configured to produce an object by a manufacturing machine includes:
   one or more instructions for receiving the object data file as a computer-aided design (CAD) model file configured to create one or more physical objects, the object data file including the authorization code configured as a checksum of the CAD model file.

32. The computer program product of claim 31 wherein the one or more instructions for receiving the object data file as a computer-aided design (CAD) model file configured to create one or more physical objects, the object data file including the authorization code configured as a checksum of the CAD model file includes:

one or more instructions for enabling the manufacturing machine to interface with the object data file when the one or more predetermined conditions are met, the one or more predetermined conditions including a pass condition following a logical operation on the checksum.

33. The computer program product of claim 26 wherein the one or more instructions for identifying at least one object data file configured to produce an object by a manufacturing machine includes:

one or more instructions for extracting the authorization code as a checksum code; and one or more instructions for comparing the checksum code to a stored checksum code, the stored checksum code determined by a generated machine identifier associated with the manufacturing machine.

34. The computer program product of claim 26 wherein the one or more instructions for identifying at least one object data file configured to produce an object by a manufacturing machine includes:

one or more instructions for enabling the manufacturing machine to perform if the authorization code meets the one or more predetermined conditions, including performing additive manufacturing using one or more of a metal, ABS (Acrylonitrile/butadiene/styrene), ABSi (ABS with high impact strength), ABS M-30 (Acrylonitrile/butadiene/styrene), PC (Polycarbonate), PC-ISO (Polycarbonate-ISO), PC/ABS (Polycarbonate/ABS Blend), PPSF (Polyphenylsulfone), clear and/or colored resin.

35. The computer program product of claim 26 further comprising:

one or more instructions for enabling the manufacturing machine to perform one or more of stereolithography (SLA), selective laser sintering (SLS), computer numerical control (CNC), and fused deposition modeling (FDM) if the authorization code meets the one or more predetermined conditions.

36. The computer program product of claim 26 further comprising:

one or more instructions for enabling the manufacturing machine to perform if the authorization code meets the one or more predetermined conditions, including performing additive manufacturing using one or more of ABS (Acrylonitrile/butadiene/styrene), ABSi (ABS with high impact strength), ABS M-30 (Acrylonitrile/butadiene/styrene), PC (Polycarbonate), PC-ISO (Polycarbonate-ISO), PC/ABS (Polycarbonate/ABS Blend), PPSF (Polyphenylsulfone), clear and/or colored resin.

37. The computer program product of claim 26 further comprising:

one or more instructions for enabling the manufacturing machine to perform if the authorization code meets the one or more predetermined conditions, including performing three-dimensional manufacturing using one or more of metal, wood, ice, stone, glass, nuclear materials, pharmaceuticals, edible substances, sand, ceramic materials, aluminum, silicon, carbides, silicon nitrides, silicon carbides, metal/ceramic combinations including aluminum/silicon nitride, aluminum/silicon carbide, aluminum/zirconia and aluminum/aluminum nitride including materials alterable by friction, heating and cooling.

38. The computer program product of claim 26 further comprising:

one or more instructions for enabling the manufacturing machine to perform if the authorization code meets the one or more predetermined conditions, including manufacturing using one or more of skin, textiles, edible substances, paper, and silicon printing.

39. The computer program product of claim 26 wherein the one or more instructions for confirming that an authorization code is associated with the object data file, the authorization code configured to be received by the manufacturing machine, the manufacturing machine adapted to receive the authorization code includes:

one or more instructions for removing a header from a file, the header including the authorization code, the file organized to include the header and the object data file.

40. The computer program product of claim 26 wherein the one or more instructions for confirming that an authorization code is associated with the object data file, the authorization code configured to be received by the manufacturing machine, the manufacturing machine adapted to receive the authorization code includes:

one or more instructions for running an application to extract the authorization code, the application configured to run a hash algorithm, the application determining whether the one or more predetermined conditions are met.

41. The computer program product of claim 26 wherein the one or more instructions for enabling the manufacturing machine to interface with the object data file only if the authorization code meets one or more predetermined conditions includes:

one or more instructions for enabling a physical component of the manufacturing machine to function if the authorization code meets the one or more predetermined conditions.

42. A manufacturing control system for secure manufacturing comprising:

a processor;

a data store coupled to the processor, the data store configured to contain authorization guideline data including one or more authorization codes, the data store adapted for identifying at least one object data file configured to produce an object by a manufacturing machine;

a confirmation module coupled to the processor, the confirmation module configured to confirm that an authorization code is associated with the object data file, the authorization code configured to be received by the manufacturing machine, the manufacturing machine adapted to receive the authorization code; and an authorization module coupled to the processor, the authorization module configured to enable the manufacturing machine to interface with the object data file only if the authorization code meets one or more predetermined conditions, wherein the manufacturing machine is configured for at least one or more of additive manufacturing, subtractive manufacturing, extrusion manufacturing, melting manufacturing, solidification manufacturing, ejection manufacturing, die casting, or a stamping process.

43. The manufacturing control system for secure manufacturing of claim 42 wherein the object data file is a computer-aided design (CAD) solid model file configured to enable the manufacturing machine to create one or more physical objects, the file including the authorization code configured as a checksum of the CAD solid model file.

44. The manufacturing control system for secure manufacturing of claim 42 wherein the manufacturing machine is adapted to interface with the object data file when the one or more predetermined conditions are met, the one or more predetermined conditions including a pass condition following a logical operation on the checksum.

45. The manufacturing control system for secure manufacturing of claim 42 wherein the confirmation module is configured for extracting the authorization code as a checksum code; and wherein the manufacturing control system further comprises a comparison module configured for comparing the checksum code to a stored checksum code, the stored checksum code determined by a generated machine identifier associated with the manufacturing machine.

46. The manufacturing control system for secure manufacturing of claim 42 further comprising:
a transceiver coupled to the processor; and
a controller coupled to the transceiver and the manufacturing machine, the control system adapted to receive a file including the authorization code and the object data file as one or more of a binary file and/or a stereolithography (STL) file and/or a computer-aided design (CAD) solid model file, the controller configured to control production of a physical object.

47. The manufacturing control system for secure manufacturing of claim 46 wherein the controller is configured for enabling a physical component of the manufacturing machine to function if the authorization code meets the one or more predetermined conditions.

48. The manufacturing control system for secure manufacturing of claim 46 wherein the controller is configured for enabling a physical component of the manufacturing machine to function if the authorization code meets the one or more predetermined conditions.

49. The manufacturing control system for secure manufacturing of claim 46 wherein the controller is configured for enabling a read function of the manufacturing machine if the authorization code meets a checksum requirement prior to opening the object data file.

50. The manufacturing control system for secure manufacturing of claim 46 wherein the controller is configured for enabling a physical component of the manufacturing machine to function if the authorization code matches one or more codes in a stored list of codes.

51. The manufacturing control system for secure manufacturing of claim 46 wherein the controller is configured to control production via a network connection.

52. The manufacturing control system for secure manufacturing of claim 51 wherein the network connection is one or more of an internet connection, a local area network connection, a metropolitan area network connection, a wide area connection and an intranet connection.

53. The manufacturing control system for secure manufacturing of claim 42 wherein the data store includes authorization guideline data having one or more of authorization codes, digital certificates, and private/public key data.

54. The manufacturing control system for secure manufacturing of claim 42 wherein the data store includes authorization guideline data adapted for identifying at least one object data file configured to produce an object via additive manufacturing, three dimensional manufacturing, two-dimensional manufacturing, rapid prototyping, three-dimensional printing, two-dimensional printing, freeform fabrication, solid freeform fabrication, and/or stereolithography.

55. The manufacturing control system for secure manufacturing of claim 42 wherein the data store includes authorization guideline data adapted for identifying at least one object data file configured to produce an object via subtractive manufacturing, drilling, milling, turning, laser cutting, waterjet cutting, plasma cutting, wire electrical discharge cutting, cold forging, warm forging, hot forging, metal fabrication, computer numerical controlled fabrication, and/or injection molding.

56. The manufacturing control system for secure manufacturing of claim 42 wherein the data store includes authorization guideline data adapted for identifying at least one object data file configured to produce an object via manufacturing using one or more of skin, textiles, edible substances, paper, and silicon printing.

57. The manufacturing control system for secure manufacturing of claim 42 wherein the data store includes authorization guideline data adapted for identifying at least one object data file configured to produce an object via stamping, extrusions, melting, die-casting, and/or solidifying.

* * * * *